United States Patent Office 3,431,797
Patented Mar. 11, 1969

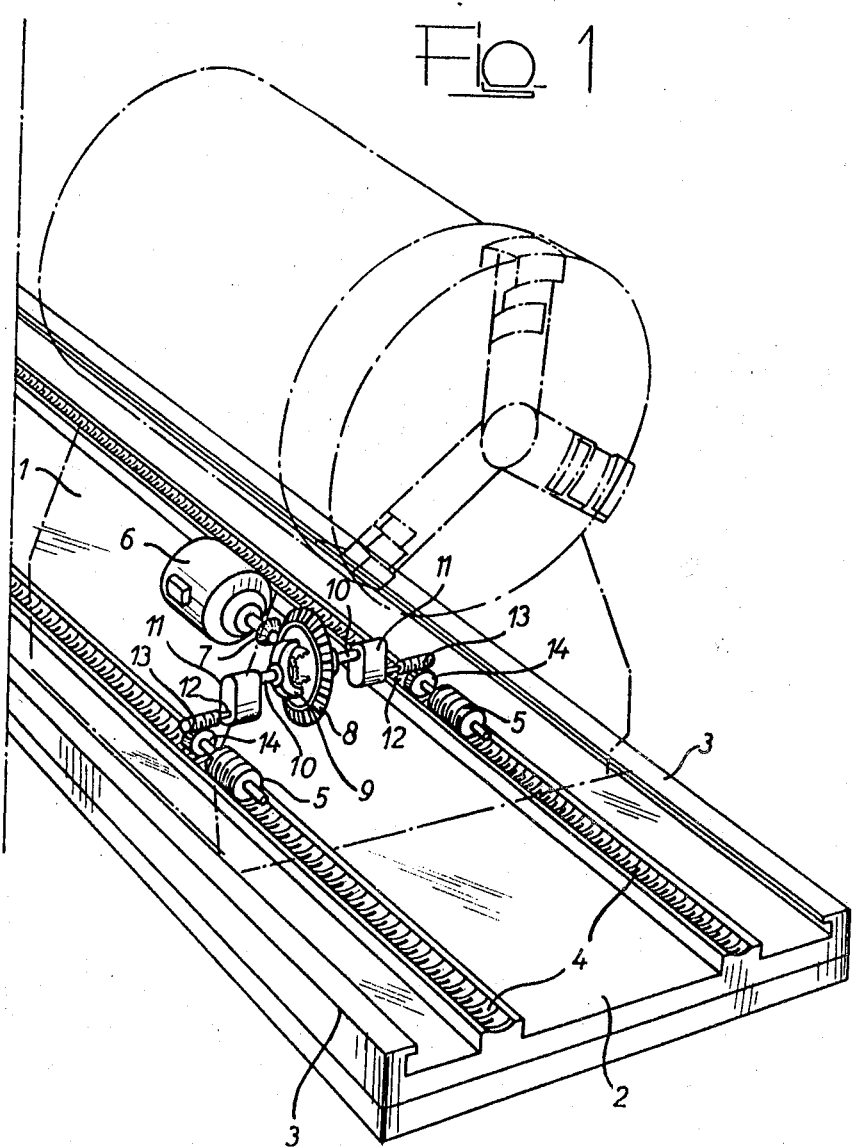

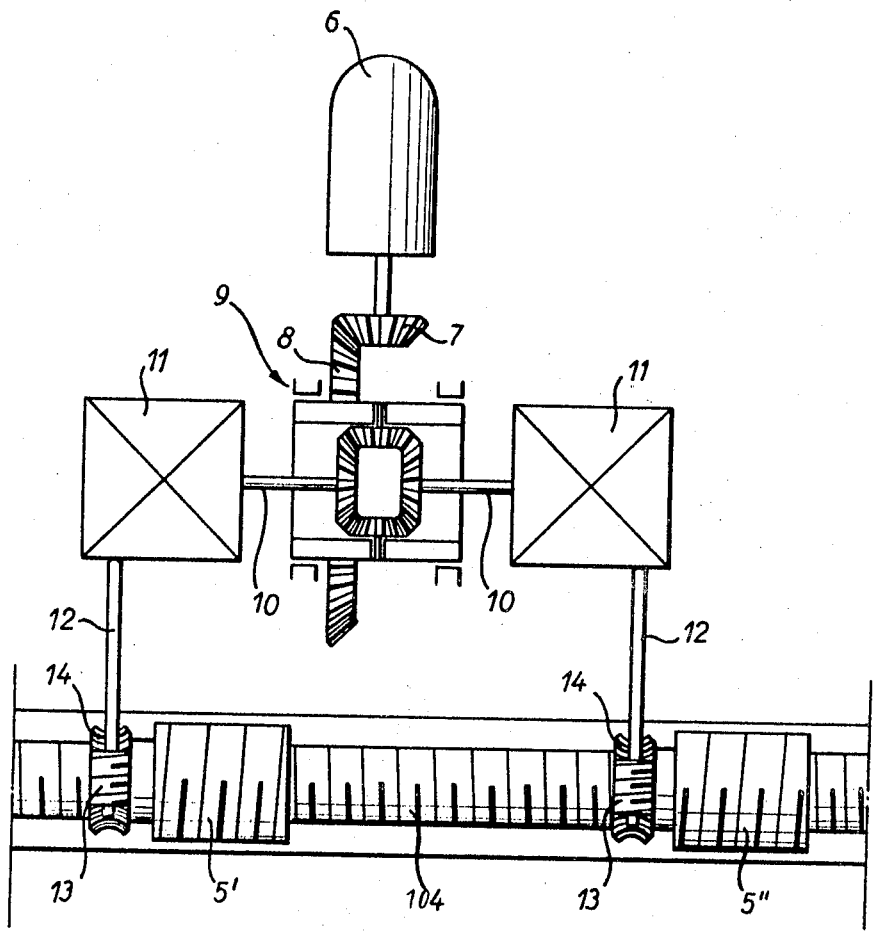

3,431,797
DEVICE FOR MOVING MACHINE TOOL COMPONENTS
Maso Galbarini and Francesco Cotta Ramusino, Milan, Italy, assignors to Innocenti Società Generale per l'Industria Metallurgica e Meccanica, Milan, Italy
Filed Apr. 12, 1967, Ser. No. 630,285
Claims priority, application Italy, Apr. 15, 1966, 9,213/66
U.S. Cl. 74—665
Int. Cl. F16h 37/06
3 Claims

ABSTRACT OF THE DISCLOSURE

A machine tool having a carriage movable on a bed includes an apparatus for driving and moving the carriage from a single drive motor through two separate drive units while utilizing a power drive train including divided power paths from the drive motor to each of the drive units. The power drive train includes an epicyclic differential gear set in order that each of the drive units has power applied equally thereto. Reduction gearing sets are interposed in the power drive train between the epicyclic differential gear set and the separate drive units. In one embodiment the drive units cooperate with a single rack on spaced portions thereof and in another embodiment the drive units cooperate with parallel spaced racks on the machine bed.

---

The invention relates to devices for moving machine tool components, more particularly components such as heavy carriages. The movement of machine tool components is usually achieved by means of rotary pinions which mesh with stationary racks, by means of driving screws which cooperate with stationary nuts or, more conveniently, by means of rotary screws which cooperate with stationary nut segments which act as racks. The last mentioned case is generally regarded as preferable because it provides a relatively more constant thrust with respect to the rack and pinion arrangement and improved rigidity with respect to the conventional screw and nut arrangement. Furthermore, considerably higher accuracy in feed and positioning are obtained by the use of rotary screws and stationary racks. As will be evident, in large-size machines the inherent considerable weight of the movable component requires substantial forces to achieve movement, and in order to maintain the specific pressure within acceptable limits, the diameter or length of the screws has to be increased. In practice, however, constructional difficulties dictate that the diameter cannot be increased beyond a given size and an increased length of the screws does not afford any advantage as constructional errors of the rack and screw would cause the threads to be unevenly stressed.

In such large-size machine tools two racks and two screws are therefore frequently used and the racks arranged to lie one to either side of the axis of thrust so that the resultant thrust is centrally disposed with respect to the tool. The use of two racks and screws is also desirable to ensure the even distribution of the driving forces.

Although the adoption of two screws cooperating each with one of two distinct racks, or even two screws cooperating both with a single central rack, avoids the various drawbacks referred to above, there now arises the problem of accurately distributing the force over the two driving screws when they are powered by a single motor.

It is an object of the present invention to provide an improved device for moving such machine tool components, the device being generally of the type comprising two driving units each including a rotary member such as a screw and each powered by a single common motor. It is a further object to provide such a device wherein the overall driving force is accurately divided into equal parts between the said two units.

A still further object of the invention is to provide a device of the type mentioned above which is simple and inexpensive in construction and is convenient in use, which effects an accurate distribution of the force over the two driving units and which compensates for any errors in construction and positioning of the rack or racks, so that the driving force is constantly applied along a predetermined straight line.

According to these and other objects of the invention there is provided a device for moving a machine tool component such as a heavy carriage, the device comprising two separate driving units each associated with the component and each including a rotary member such as a screw, the said rotary member of each unit being arranged to cooperate with either a common stationary member such as a rack or one of a pair of such stationary members and to be drivable by a single common prime drive means such as a motor via an epicyclic gear so that the driving forces from the said drive means are equally distributed between the two said members, rotation of the rotary members of the driving units in engagement with the said stationary member or members causing movement of the machine tool component with respect thereto.

These and other objects and advantages of the invention will be clear from the following description, given with reference to the accompanying drawings which are by way of example and in which:

FIGURE 1 is a perspective view of a machine tool provided with a device according to the invention, and FIGURE 2 is a diagrammatical plan view showing a modification of the device of FIGURE 1.

In FIGURE 1 of the drawings, a movable member 1 of the machine tool, for instance and as shown, a carriage is slidably mounted on a stationary platform 2 by means of two lateral guides 3. The carriage 1 is moved along the said guides by means of two rotatable driving screws 5 which are carried by the said carriage and which cooperate with two stationary segments 4 which are securedly fixed to the stationary platform 2 to form two parallel racks thereon.

The carriage 1 incorporates an electric motor 6 which provides the driving power for the device, the said motor 6 being connected by a pinion and toothed rim gearing arrangement 7, 8 to an epicyclic differential gear 9. This latter gear 9 is provided with two stub axles 10, each associated with a transmission chain comprising a reducing gear 11, an output shaft 12 therefrom and a reducing worm gear pair 13, 14, the gears 14 of which pairs are each fixedly secured to one of the two aforementioned driving screws 5.

Both screws 5 cooperate, as indicated above, with the stationary racks 4 and are rotated by the motor 6, the torque from which motor is accurately and equally divided between the screws 5 by the differential gear 9. Apart from negligible differences in torque due to variations in friction in the two transmission chains, the two screws 5 each exert the same thrust on their respective racks 4 and ensure, notwithstanding appreciable errors in the construction and/or positioning of the said racks 4, constancy of the straight line along which the driving force is applied.

In the embodiment shown in FIGURE 1, a single motor 6 drives two driving screws 5 which cooperate with two parallel racks 4. In the modified embodiment shown in FIGURE 2, however, the movable component of the machine tool is driven by two screws 5', 5", both of which cooperate with a single common rack 104. In this embodiment the driving arrangement for the screws 5', 5" is otherwise generally similar to that of the embodiment of FIGURE 1 and includes an electric motor 6, which drives the said screws through a bevel gearing arrangement 7, 8, a differential gear 9 with two output stub-axles 10, two separate reducing gears 11, each with an output shaft 12 and two separate reducing worm gear pairs 13, 14. The advantages afforded by the arrangement of FIGURE 1 are afforded also by the arrangement of FIGURE 2, for the reasons set forth in connection with the aforementioned figure.

Various modifications of the invention are of course possible within the scope of the appended claims, for instance the device as described is capable of distributing the thrust over two transmission chains of any suitable kind, the terminal arrangements 4, 5 and 104, 5′, 5″, having been instanced herein purely by way of example.

We claim:
1. In a machine tool of the type having a carriage movable on a bed, apparatus for moving the carriage, the apparatus including:
   (a) a single drive motor carried by the carriage,
   (b) at least one stationary rack member fixed to the machine tool bed,
   (c) a pair of rotary members carried by the carriage and engaging the stationary rack member so that rotation of the rotary members moves the carriage, with the improvements comprising: a power drive train with divided power paths from the drive motor to each of the rotary members to divide the power equally, the drive train including:
      (i) a motor output drive shaft with a pinion thereon,
      (ii) an epicyclic differential gear set with a gear on a differential carrier engaged with the motor drive shaft pinion, the differential carrier carrying gears meshing with gears atatched to two output shafts,
      (iii) a pair of reduction gearing sets, one connected to each of the differential output shafts, and
      (iv) a reduction gearing output shaft for each set of reduction gearing, connected to one of the rotary members carried by the carriage.

2. Apparatus as in claim 1 wherein there is a single stationary rack engaged at spaced positions by the rotary members so that the carriage moves longitudinally of the rack.

3. Apparatus as in claim 1 wherein there are a pair of parallel racks each engaged by one of the rotary members so that the carriage moves longitudinally of the rack.

References Cited

UNITED STATES PATENTS

| | | | |
|---|---|---|---|
| 168,955 | 10/1875 | Annin | 74—710 X |
| 2,314,664 | 3/1943 | Shenstone | 74—710 X |
| 2,553,958 | 5/1951 | Chelminski et al. | 74—710 X |
| 2,666,342 | 1/1954 | Bell | 74—710 |
| 3,027,780 | 4/1962 | Storer et al. | 74—710 |
| 3,055,224 | 9/1962 | MacGeorge | 74—665 X |

ARTHUR McKEON, *Primary Examiner.*